United States Patent
Lin

(10) Patent No.: US 12,538,400 B2
(45) Date of Patent: Jan. 27, 2026

(54) CONTROL SYSTEM AND METHOD FOR ADJUSTING DIMMING RANGE OF LAMP

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 51 days.

(21) Appl. No.: 18/794,887

(22) Filed: Aug. 5, 2024

(65) Prior Publication Data
US 2025/0056692 A1 Feb. 13, 2025

(30) Foreign Application Priority Data
Aug. 7, 2023 (TW) .................... 112129560

(51) Int. Cl.
*H05B 45/10* (2020.01)
*H05B 45/34* (2020.01)
*H05B 45/3577* (2020.01)

(52) U.S. Cl.
CPC ......... *H05B 45/3577* (2020.01); *H05B 45/34* (2020.01)

(58) Field of Classification Search
CPC ........ H05B 45/10; H05B 45/30; H05B 45/34; H05B 45/37; H05B 45/38; H05B 45/327; H05B 45/345; H05B 45/3575; H05B 45/3577; H05B 45/3725
See application file for complete search history.

(56) References Cited

U.S. PATENT DOCUMENTS

| | | | | |
|---|---|---|---|---|
| 8,487,546 | B2* | 7/2013 | Melanson | H05B 45/327 315/297 |
| 10,104,731 | B2* | 10/2018 | Hu | H05B 45/10 |
| 10,736,187 | B2* | 8/2020 | Lewis | H05B 45/10 |
| 2007/0182347 | A1* | 8/2007 | Shteynberg | H05B 45/3725 315/312 |
| 2011/0121752 | A1* | 5/2011 | Newman, Jr. | H05B 39/048 315/291 |
| 2013/0002163 | A1* | 1/2013 | He | H05B 45/14 315/297 |
| 2019/0215927 | A1* | 7/2019 | Sooch | H05B 45/28 |

* cited by examiner

*Primary Examiner* — Tung X Le
(74) *Attorney, Agent, or Firm* — Birch, Stewart, Kolasch & Birch, LLP

(57) ABSTRACT

A control system for a lighting device includes a driving circuit, a current detection circuit and a control unit. The driving circuit is configured to output a driving signal for driving the lighting device to emit light. The current detection circuit is configured to detect a current of the lighting device. The control unit is configured to control the driving circuit to gradually reduce an average voltage across the successive wave periods of the driving signal for reducing brightness of the light emitted by the lighting device. In response to determining that the current of the lighting device corresponds to an unstable condition, the control unit obtains critical dimming information related to the driving signal that is outputted when the unstable condition of the lighting device occurs, and then obtains a limiting threshold for adjusting the brightness of the lighting device based on the critical dimming information.

12 Claims, 4 Drawing Sheets

CONTROL SYSTEM AND METHOD FOR ADJUSTING DIMMING RANGE OF LAMP

CROSS-REFERENCE TO RELATED APPLICATION

This application claims priority to Taiwanese Invention patent application No. 112129560, filed on Aug. 7, 2023, the entire disclosure of which is incorporated by reference herein.

FIELD

The disclosure relates to a control system and a method for adjusting a dimming range of a lamp.

BACKGROUND

In recent years, light-emitting diodes (LEDs) are widely used in a ceiling fan with lights due to their advantages such as low power consumption and long service life. Referring to FIG. 1, an LED lamp receives an output voltage 11 from a triode for alternating current (TRIAC, not shown), and a conventional method for adjusting a brightness of the LED lamp includes controlling a conducting time (t) of the TRIAC to change a waveform of the output voltage 11 that is provided to the LED lamp.

In practice, a dimming range of light is fixed by the manufacturer (e.g., the conducting time (t) is set to range from 4 ms to 8.3 ms) of the ceiling fan so that a user may adjust the brightness of the LED lamp within this dimming range. However, LED lamps from different manufacturers may have different dimming ranges. If a lower limit of the dimming range of the ceiling fan is set to be too short such that the output voltage 11 provided to the lamp is lower than a minimum operable voltage of an LED lamp used in the ceiling fan, the LED lamp may start to flicker or be turned off due to insufficient voltage; if the lower limit of the dimming range of the ceiling fan is set to be too long such that the output voltage 11 provided to the lamp is higher than the minimum operable voltage of an LED lamp used in the ceiling fan, the brightness of the LED lamp would be kept at a higher brightness even though the LED lamp could have been dimmer.

SUMMARY

Therefore, an object of the disclosure is to provide a control system and a method for adjusting a dimming range of a lamp that can alleviate at least one of the drawbacks of the prior art.

According to an aspect of the disclosure, a control system for a lighting device includes a driving circuit, a current detection circuit and a control unit. The driving circuit is configured to be electrically connected to the lighting device and to output a driving signal for driving the lighting device to emit light, and includes a driving switch that is configured to adjust a conduction angle of the driving signal. The current detection circuit is configured to be electrically connected to the lighting device, to detect a current of the lighting device, and to output a detection signal indicating the current of the lighting device based on the current thus detected. The control unit is electrically connected to the driving circuit and the current detection circuit, and is configured to receive the detection signal from the current detection circuit. The control unit is further configured to control the driving switch to switch between a conducting state where the driving signal is in an on state, and a non-conducting state where the driving signal is in an off state, such that the driving signal is in the off state for a pausing time period from a zero-crossing of a sine waveform corresponding to the driving signal, and changes to the on state for an active time period immediately after the pausing time period until a next zero-crossing of the sine waveform. The control unit is further configured to implement a calibrating process to control the driving switch to gradually extend the pausing time period across successive wave periods of the driving signal, so as to gradually reduce an average voltage across the successive wave periods of the driving signal for reducing brightness of the light emitted by the lighting device. In response to determining that the current of the lighting device indicated by the detection signal corresponds to an unstable condition where the lighting device is one of flickering and turned off, the control unit obtains critical dimming information related to the driving signal that is outputted when the unstable condition of the lighting device occurs, and then obtains a limiting threshold for adjusting the brightness of the lighting device based on the critical dimming information.

According to another aspect of the disclosure, a method for adjusting a dimming range of a lamp is provided. The lamp includes a control system and a lighting device. The control system includes a control unit, and a driving circuit that is configured to output a driving signal for driving the lighting device to emit light. The driving circuit includes a driving switch that is configured to adjust a conduction angle of the driving signal. The method is implemented by the control unit of the control system, and includes: controlling the driving switch to switch between a conducting state where the driving signal is in an on state, and a non-conducting state where the driving signal is in an off state, such that the driving signal is in the off state for a pausing time period from a zero-crossing of a sine waveform corresponding to the driving signal, and changes to the on state for an active time period immediately after the pausing time period until a next zero-crossing of the sine waveform; implementing a calibrating process to control the driving circuit to gradually extend the pausing time period across successive wave periods of the driving signal, so as to gradually reduce an average voltage across the successive wave periods of the driving signal for reducing brightness of the light emitted by the lighting device; during the calibrating process, in response to determining that a current of the lighting device corresponds to an unstable condition where the lighting device is one of flickering and turned off, obtaining critical dimming information related to the driving signal that is outputted when the unstable condition of the lighting device occurs; and obtaining a limiting threshold for adjusting the brightness of the lighting device based on the critical dimming information.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
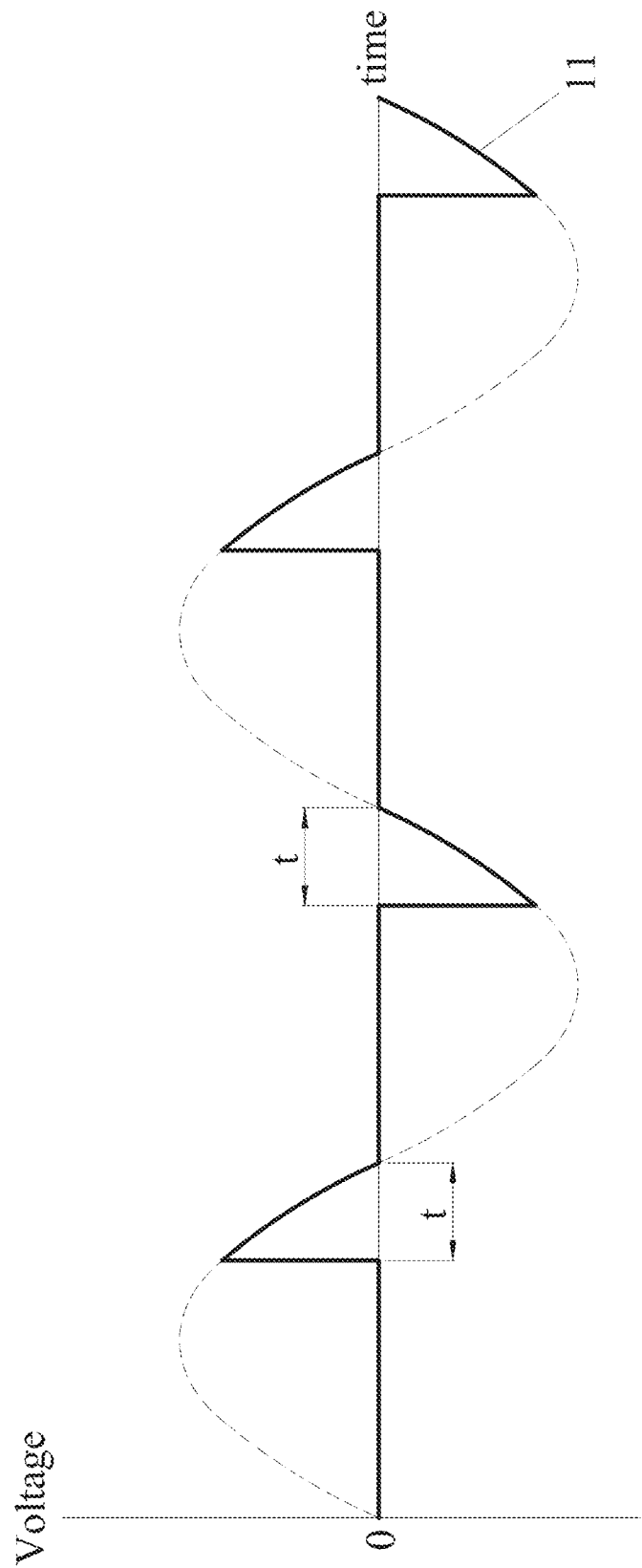
FIG. 1 is a schematic view illustrating a waveform of an output voltage for adjusting a brightness of a light-emitting diode (LED) lamp in a conventional method.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
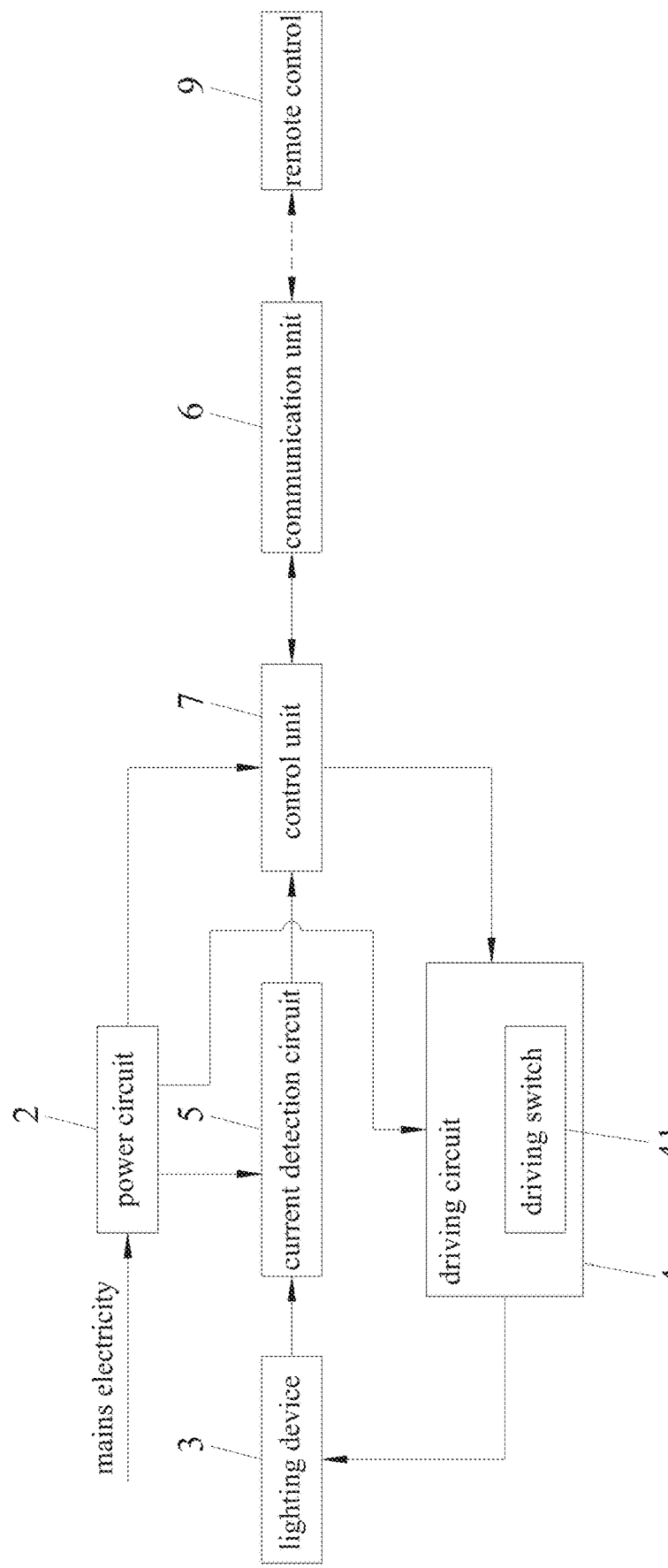
FIG. 2 is a block diagram illustrating a lamp that includes a control system according to an embodiment of the disclosure.

Referring to FIG. 2, a lamp includes a control system, a power circuit 2, a lighting device 3, and a communication unit 6 for communicating with a remote control 9. The control system according to an embodiment of the disclosure includes a driving circuit 4, a current detection circuit 5, and a control unit 7.

The power circuit 2 is configured to receive electricity from an external power source (e.g., mains electricity), and to stabilize and transform the electricity to provide an electric signal for use by internal circuits of the lamp such as the driving circuit 4, the current detection circuit 5 and the control unit 7.

The lighting device 3 includes a plurality of light emitting diodes (LED), and is configured to receive a driving signal and to emit light based on the driving signal.

The driving circuit 4 is electrically connected to the lighting device 3, and is controlled by the control unit 7 to output the driving signal for driving the lighting device 3 to emit light. The driving circuit 4 includes a driving switch 41 that is, for example, a triode for alternating current (TRIAC), and that is configured to be controlled by the control unit 7 to switch between a conducting state and a non-conducting state, so as to adjust a conduction angle of the driving signal for adjusting brightness of the light emitted by the lighting device 3. When the driving switch 41 is in the conducting state, the driving signal is in an on state (i.e., outputting the electric signal as the driving signal), and when the driving switch 41 is in the non-conducting state, the driving signal is in an off state (i.e., the voltage of the driving signal is zero).

Figure 3:
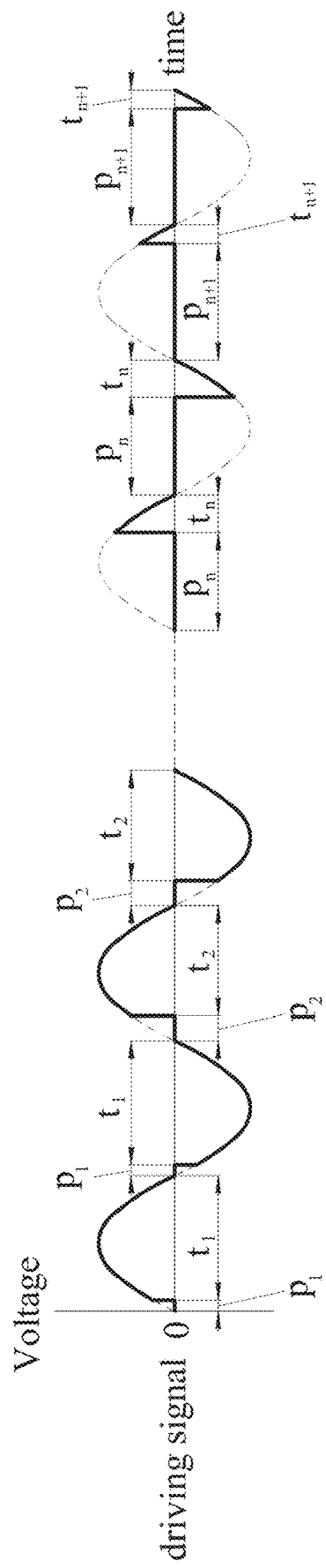
FIG. 3 is a plot illustrating a waveform of a driving signal according to an embodiment of the disclosure.

Referring further to FIG. 3, the driving switch 41 is controlled by the control unit 7 in a manner such that the driving signal is in the off state for a pausing time period (p1, p2, . . . , pn, pn+1) from a zero-crossing of a sine waveform corresponding to the driving signal, and changes to the on state for an active time period (t1, t2, . . . , tn, tn+1) immediately after the pausing time period until a next zero-crossing of the sine waveform. Since one having ordinary skill in the art may infer details of the driving circuit 4 from the above description, it will not be described in further detail for the sake of brevity.

The current detection circuit 5 is electrically connected to the lighting device 3, and is configured to detect a current of the lighting device 3 and to output a detection signal indicating the current of the lighting device 3 based on the current thus detected.

The communication unit 6 is electrically connected to the control unit 7, allowing the control unit 7 to communicate with the remote control 9. As such, a user may control operation of the lamp through the remote control 9. For example, the user may operate the remote control 9 (e.g., by pressing a specific button on the remote control 9) within a preset time (e.g., 30 seconds or 60 seconds) after the lamp is powered on, so as to cause the control unit 7 to perform a method for adjusting a dimming range of the lamp. In some embodiments, the remote control 9 may be a handheld remote control that communicates with the communication unit 6 using short-range wireless communication technologies such as Bluetooth®, infrared waves, and/or Wi-Fi. In some embodiments, the remote control 9 may be attached to a wall and is directly connected to the communication unit 6 through, for example, an electrical wire.

In this embodiment, the communication unit 6 may include one or more of a short-range wireless communication module supporting a short-range wireless communication network using a wireless technology such as Bluetooth® and/or Wi-Fi, etc.

The control unit 7 is electrically connected to the power circuit 2, the driving circuit 4 and the current detection circuit 5, receives the detection signal from the current detection circuit 5, and controls operation of the driving circuit 4. The control unit 7 is configured to implement a calibrating process, during which the control unit 7 controls the driving circuit 4 to gradually reduce an average voltage across successive wave periods of the driving signal for gradually reducing the brightness of the light emitted by the lighting device 3. While the average voltage is being gradually reduced, when the control unit 7 determines that the current of the lighting device 3 indicated by the detection signal corresponds to an unstable condition where the lighting device 3 is either flickering or turned off, the control unit 7 obtains critical dimming information related to the driving signal that is outputted when the unstable condition of the lighting device 3 occurs, and then obtains a limiting threshold for adjusting the brightness of the lighting device 3 based on the critical dimming information. As such, the dimming range is adjusted to be corresponding to the limiting threshold. The control unit 7 stores the limiting threshold, and is further configured to implement an operating process, during which the control unit 7 controls the driving circuit 4 to output the driving signal according to the limiting threshold. The control unit 7 may be implemented using a circuit capable of performing calculations, storing information, etc., such as a microcontroller (MCU).

An actual application of the disclosure is illustrated in the following.

When a user intends for the lamp to perform the function of automatically adjusting the dimming range, the user may operate on the remote control 9 so as to cause the control unit 7 to start implementing the calibrating process. In one example, the user may press a specific button on the remote control 9 within 30 seconds after the lamp is powered on to trigger the calibrating process. In another example, the calibrating process is automatically performed by the control unit 7 when the remote control 6 is paired with the lamp. In yet another example, every time the lamp is powered on, the calibrating process is automatically performed. In any of the examples mentioned above, the limiting threshold obtained during the calibrating process is stored in the control unit 7 to be used in the operating process.

During the calibrating process, the control unit 7 controls the driving switch 41 to gradually extend the pausing time period ($p_1$, $p_2$, . . . , $p_n$, $p_{n+1}$) across the successive wave periods of the driving signal (as shown in FIG. 3), so that the active time period ($t_1$, $t_2$, . . . , $t_n$, $t_{n+1}$) is gradually reduced, thus gradually reducing the average voltage across the successive wave periods of the driving signal, which gradually reduces the brightness of the light emitted by the lighting device 3.

In some embodiments, the pausing time period ($p_1$, $p_2$, ..., $p_n$, $p_{n+1}$) may be extended by a fixed time length ($\Delta t$) after every wave period of the sine waveform, that is to say, the active time period ($t_1$, $t_2$, ..., $t_n$, $t_{n+1}$) may be reduced by the fixed time length ($\Delta t$) after every wave period of the sine waveform. In some embodiments, the pausing time period ($p_1$, $p_2$, ..., $p_n$, $p_{n+1}$) may first be extended by a first time length ($\Delta t_1$) after every wave period of the sine waveform for a predetermined number of wave periods, and then be extended by a second time length ($\Delta t_2$) after every wave period of the sine waveform for the following wave periods, where the second time length ($\Delta t_2$) is shorter than the first time length ($\Delta t_1$).

The pausing time period may be set to a predetermined time period ($p_1$) initially (as shown in FIG. 3), or may be set to zero initially (i.e., the driving signal is in the on state immediately after the first zero-crossing of the sine waveform). In one example, the predetermined time period ($p_1$) may be set, according to user preference, to be close to half of a duration of half of the sine waveform corresponding to the driving signal, or one third or a quarter of the duration of half of the sine waveform, so that a time for performing the calibrating process may be shortened. To describe in further detail, if the driving signal has a frequency of 60 Hz, the duration of half of the sine waveform is approximately 0 to 8.3 ms (if the driving signal has a frequency of 50 Hz, the duration of half of the sine waveform is approximately 0 to 10 ms), and the predetermined time period ($p_1$) may be set to be 4.15 ms (i.e., half of the duration), 2.77 ms (i.e., one third of the duration), or 2.08 ms (i.e., a quarter of the duration).

During the calibrating process, when the active time period of the driving signal is gradually reduced to a point where the electric power provided by the driving signal is lower than what the lighting device 3 requires to operate normally (e.g., when the voltage provided to the lighting device 3 is too low), the lighting device 3 would be in the unstable condition where the lighting device 3 is either flickering or is turned off. The control unit 7 may determine the current of the lighting device 3 that corresponds to the unstable condition through the current detection circuit 5. To describe in further detail, the current of the lighting device 3 gradually decreases as the electric power provided by the driving signal gradually decreases. When the current of the lighting device 3 indicated by the detection signal is less than a predetermined current value (e.g., close to zero), the control unit 7 determines that the lighting device 3 is turned off. When the current of the lighting device 3 indicated by the detection signal is fluctuating, the control unit 7 determines that the lighting device 3 is flickering.

During the calibrating process, when determining that the current of the lighting device 3 indicated by the detection signal corresponds to the unstable condition, the control unit 7 records the pausing time period (or the active time period) of the driving signal that is outputted when the unstable condition of the lighting device 3 occurs as the critical dimming information. Then, the control unit 7 subtracts a predetermined time length from the pausing time period of the critical dimming information, so as to obtain the limiting threshold. Finally, the control unit 7 implements the operating process to control the driving circuit 4 to output the driving signal with the pausing time period that does not exceed the limiting threshold (i.e., an upper limit of the dimming range of the lamp is set to be equal to the limiting threshold).

The predetermined time length may be a prefixed value (e.g., 0.1 ms, 0.2 ms, 0.5 ms, or 1 ms), may be a time difference between the pausing time period thus recorded (e.g., $p_{n+1}$) and a previous pausing time period (e.g., $p_n$) immediately before the pausing time period thus recorded, or may be a time difference between the pausing time period thus recorded (e.g., $p_{n+1}$) and a prior pausing time period (e.g., $p_{n-1}$, $p_{n-2}$, or $p_{n-3}$).

Assuming that the lighting device 3 starts to flicker when the active time period is reduced to ($t_{n+1}$) (see FIG. 3), the control unit 7 would record the pausing time period ($p_{n+1}$) (or record the active time period ($t_{n+1}$)), and then subtracts the predetermined time length from the pausing time period ($p_{n+1}$) so as to obtain the limiting threshold. In one example, if the pausing time period thus recorded (e.g., $p_{n+1}$) is equal to 4.5 ms, and if the predetermined time length is equal to 0.2 ms, then the limiting threshold would be obtained as 4.3 ms, and the dimming range of the lamp would range from 0 ms to 4.3 ms. In another example, if the pausing time period thus recorded (e.g., $p_{n+1}$) is equal to 4.5 ms, and if the predetermined time length is equal to the previous extended time length (e.g., 0.1 ms), then the limiting threshold would be obtained as 4.4 ms (i.e., return to using the active time period ($t_n$) for the driving signal), and the dimming range of the lamp would range from 0 ms to 4.4 ms.

Then, the control unit 7 implements the operating process, during which the control unit 7 controls the driving circuit 4 to output the driving signal according to the limiting threshold. That is to say, the limiting threshold defines a limit of the dimming range that the pausing time period of the driving signal may be extended to while keeping the lamp in normal operation (i.e., avoiding the unstable condition of the lighting device 3).

Figure 4:
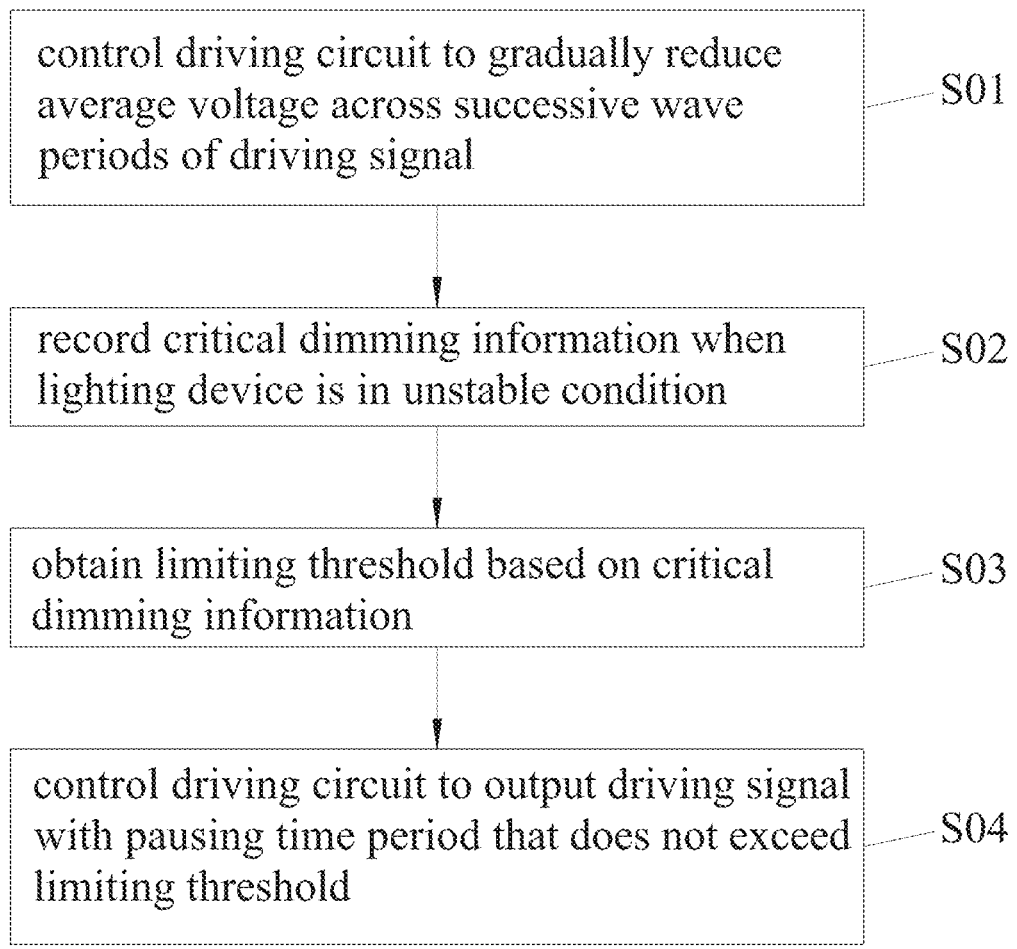
FIG. 4 is a flow chart illustrating a method for adjusting a dimming range of a lamp according to an embodiment of the disclosure.

Referring further to FIG. 4, the method for adjusting the dimming range of the lamp is implemented by the control system as mentioned above, and a flow of the method includes steps S01 to S04. Specifically, the calibrating process includes steps S01 to S03, and the operating process includes step S04.

In step S01, the control unit 7 implements the calibrating process, during which the control unit 7 controls the driving circuit 4 to gradually extend the pausing time period (i.e., gradually reducing the active time period) across the successive wave periods of the driving signal, so as to gradually reduce the average voltage across the successive wave periods of the driving signal for reducing the brightness of the light emitted by the lighting device 3.

In step S02, in response to determining that the current of the lighting device 3 indicated by the detection signal corresponds to the unstable condition where the lighting device 3 is either flickering or turned off, the control unit 7 records the pausing time period (or the active time period) of the driving signal that is outputted when the unstable condition occurs as the critical dimming information. Specifically, the control unit 7 determines that the lighting device 3 is turned off when the current of the lighting device 3 indicated by the detection signal is less than the predetermined current value, and determines that the lighting device 3 is flickering when the current of the lighting device 3 indicated by the detection signal is fluctuating. It should be noted that the control unit 7 receives the detection signal from the current detection circuit 5 during the calibrating process.

In step S03, the control unit 7 obtains the limiting threshold by subtracting the predetermined time length from the pausing time period of the critical dimming information.

In step S04, the control unit 7 implements the operating process, during which the control unit 7 controls the driving circuit 4 to output the driving signal with the pausing time period that does not exceed the limiting threshold.

In summary, according to the disclosure, the control system of the lamp includes the driving circuit 4, the current detection circuit 5 and the control unit 7. During the calibrating process, the control unit 7 controls the driving circuit 4 to gradually extend the pausing time period of the driving signal, and obtains the limiting threshold based on the critical dimming information that is recorded when the unstable condition occurs. During the operating process, the control unit 7 controls the driving circuit 4 to output the driving signal with the pausing time period that does not exceed the limiting threshold. As such, the control system may automatically determine the limit of the dimming range that the pausing time period of the driving signal may be extended to while keeping the lamp in normal operation, thus avoiding the unstable condition (e.g., flickering or turned off) of the lighting device 3 while allowing the lighting device 3 to reach the minimum brightness which the lighting device 3 is capable of outputting stably.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A control system for a lighting device, comprising:
    a driving circuit configured to be electrically connected to the lighting device and to output a driving signal for driving the lighting device to emit light, and including a driving switch that is configured to adjust a conduction angle of the driving signal;
    a current detection circuit configured to be electrically connected to the lighting device, to detect a current of the lighting device, and to output a detection signal indicating the current of the lighting device based on the current thus detected; and
    a control unit electrically connected to said driving circuit and said current detection circuit, and configured to
        receive the detection signal from said current detection circuit,
        control said driving switch to switch between a conducting state where the driving signal is in an on state, and a non-conducting state where the driving signal is in an off state, such that the driving signal is in the off state for a pausing time period from a zero-crossing of a sine waveform corresponding to the driving signal, and changes to the on state for an active time period immediately after the pausing time period until a next zero-crossing of the sine waveform, and
        implement a calibrating process to control said driving switch to gradually extend the pausing time period across successive wave periods of the driving signal, so as to gradually reduce an average voltage across the successive wave periods of the driving signal for reducing brightness of the light emitted by the lighting device, in response to determining that the current of the lighting device indicated by the detection signal corresponds to an unstable condition where the lighting device is one of flickering and turned off, to obtain critical dimming information related to the driving signal that is outputted when the unstable condition of the lighting device occurs, and then to obtain a limiting threshold for adjusting the brightness of the lighting device based on the critical dimming information.

2. The control system as claimed in claim 1, wherein said control unit is further configured to implement an operating process to control said driving circuit to output the driving signal according to the limiting threshold.

3. The control system as claimed in claim 2, wherein said control unit is configured to:
    during the calibrating process, in response to determining that the current of the lighting device indicated by the detection signal corresponds to the unstable condition, record the pausing time period of the driving signal that is outputted when the unstable condition of the lighting device occurs as the critical dimming information, and obtain the limiting threshold by subtracting a predetermined time length from the pausing time period of the critical dimming information; and
    during the operating process, control said driving circuit to output the driving signal with the pausing time period that does not exceed the limiting threshold.

4. The control system as claimed in claim 1, wherein the critical dimming information includes one of the active time period and the pausing time period of the driving signal.

5. The control system as claimed in claim 1, wherein said control unit is configured to, during the calibrating process, in response to determining that the current of the lighting device indicated by the detection signal corresponds to the unstable condition, record the pausing time period of the driving signal that is outputted when the unstable condition of the lighting device occurs as the critical dimming information, and obtain the limiting threshold by subtracting a predetermined time length from the pausing time period of the critical dimming information.

6. The control system as claimed in claim 1, wherein said control unit is configured to determine that the lighting device is turned off when the current of the lighting device indicated by the detection signal is less than a predetermined current value, and to determine that the lighting device is flickering when the current of the lighting device indicated by the detection signal is fluctuating.

7. A method for adjusting a dimming range of a lamp, the lamp including a control system and a lighting device, the control system including a control unit and a driving circuit that is configured to output a driving signal for driving the lighting device to emit light, the driving circuit including a driving switch that is configured to adjust a conduction angle of the driving signal, the method implemented by the control unit of the control system, and comprising:

controlling the driving switch to switch between a conducting state where the driving signal is in an on state, and a non-conducting state where the driving signal is in an off state, such that the driving signal is in the off state for a pausing time period from a zero-crossing of a sine waveform corresponding to the driving signal, and changes to the on state for an active time period immediately after the pausing time period until a next zero-crossing of the sine waveform; and implementing a calibrating process that includes
controlling the driving circuit to gradually extend the pausing time period across successive wave periods of the driving signal, so as to gradually reduce an average voltage across the successive wave periods of the driving signal for reducing brightness of the light emitted by the lighting device,
in response to determining that a current of the lighting device corresponds to an unstable condition where the lighting device is one of flickering and turned off, obtaining critical dimming information related to the driving signal that is outputted when the unstable condition of the lighting device occurs, and
obtaining a limiting threshold for adjusting the brightness of the lighting device based on the critical dimming information.

8. The method as claimed in claim 7, further comprising implementing an operating process to control the driving circuit to output the driving signal according to the limiting threshold.

9. The method as claimed in claim 8, wherein:
during the calibrating process, in response to determining that the current of the lighting device corresponds to the unstable condition, the control unit records the pausing time period of the driving signal that is outputted when the unstable condition of the lighting device occurs as the critical dimming information, and obtains the limiting threshold by subtracting a predetermined time length from the pausing time period of the critical dimming information; and
during the operating process, the control unit controls the driving circuit to output the driving signal with the pausing time period that does not exceed the limiting threshold.

10. The method as claimed in claim 7, wherein the critical dimming information includes one of the active time period and the pausing time period of the driving signal.

11. The method as claimed in claim 7, wherein, during the calibrating process, in response to determining that the current of the lighting device corresponds to the unstable condition, the control unit records the pausing time period of the driving signal that is outputted when the unstable condition of the lighting device occurs as the critical dimming information, and obtains the limiting threshold by subtracting a predetermined time length from the pausing time period of the critical dimming information.

12. The method as claimed in claim 7, wherein, during the calibrating process, the control unit determines that the lighting device is turned off when the current of the lighting device is less than a predetermined current value, and determines that the lighting device is flickering when the current of the lighting device is fluctuating.

\* \* \* \* \*